May 24, 1927. 1,630,033
J. RUDLAND
MOWING AND REAPING MACHINE
Filed Feb. 15, 1924 5 Sheets-Sheet 3
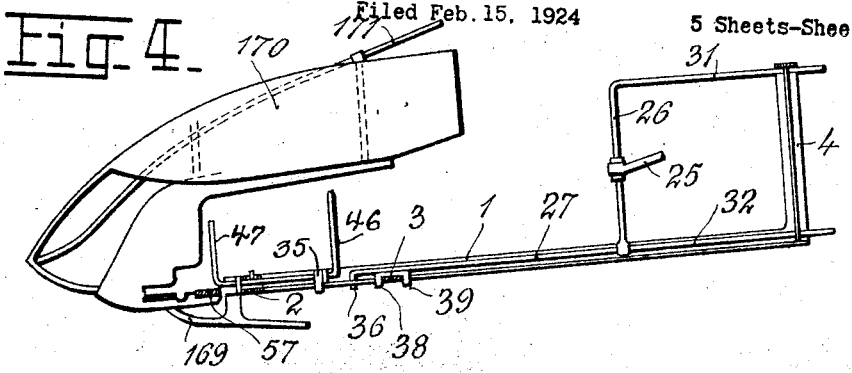
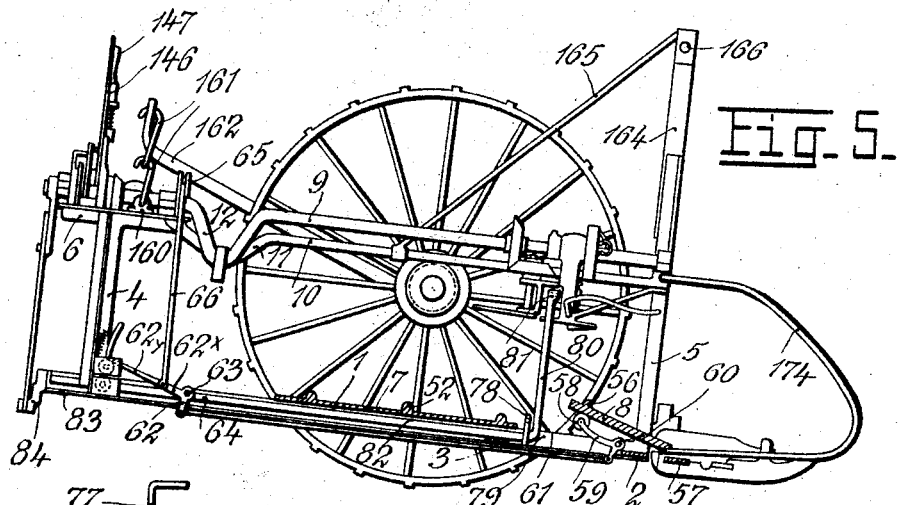
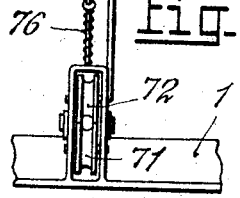
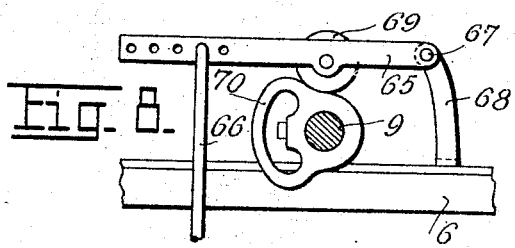
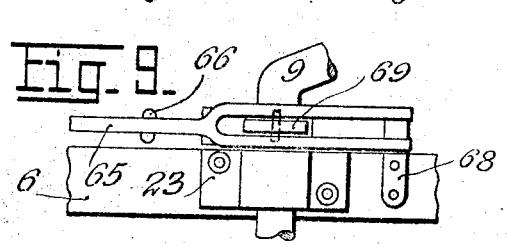
Inventor
Johannes Rudland
By Henry Orth Jr
Atty.

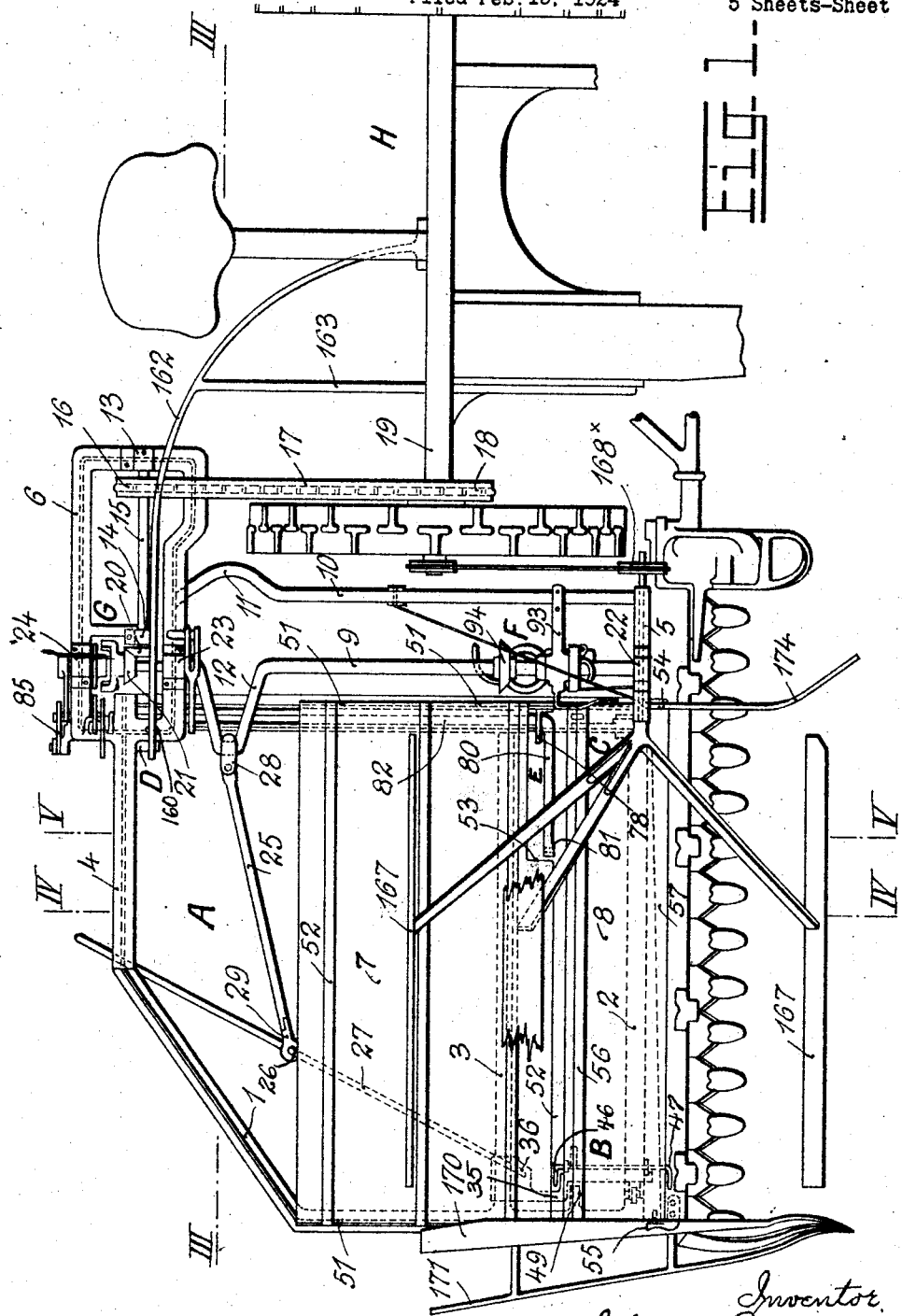

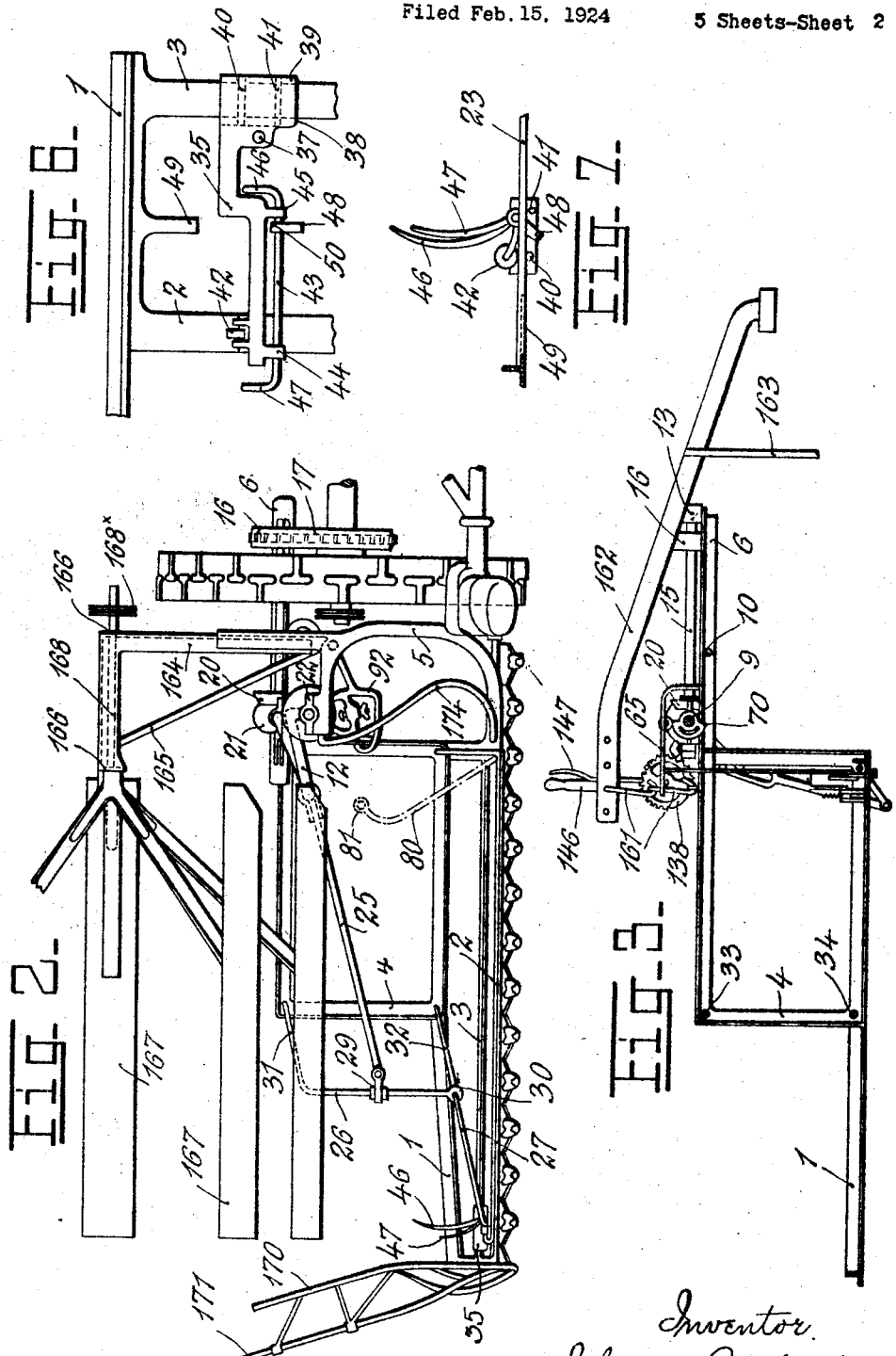

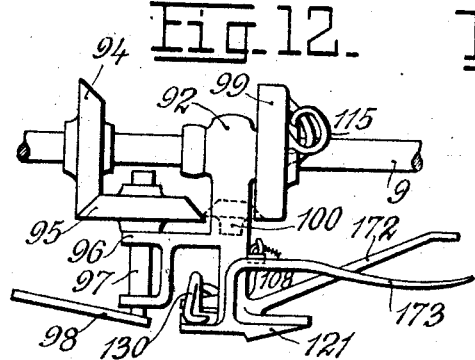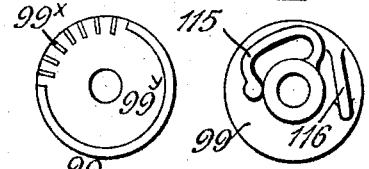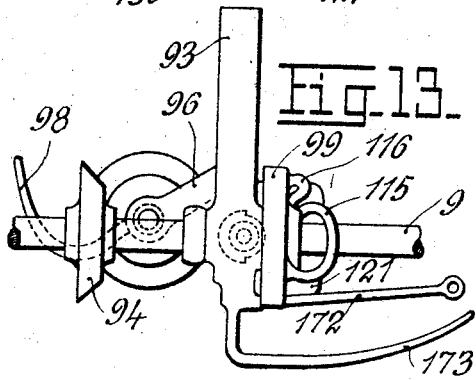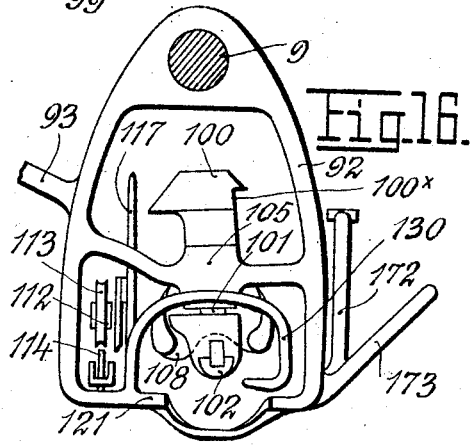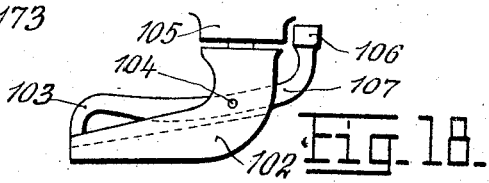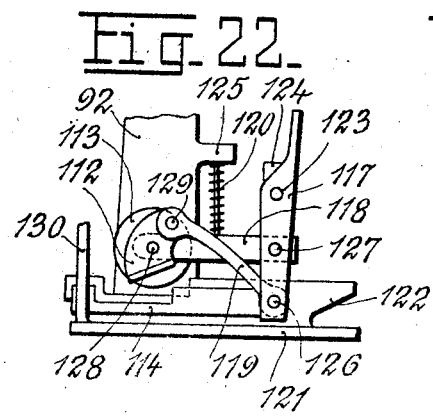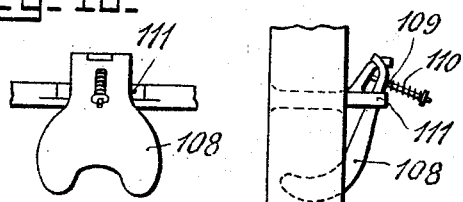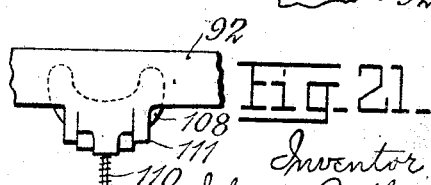

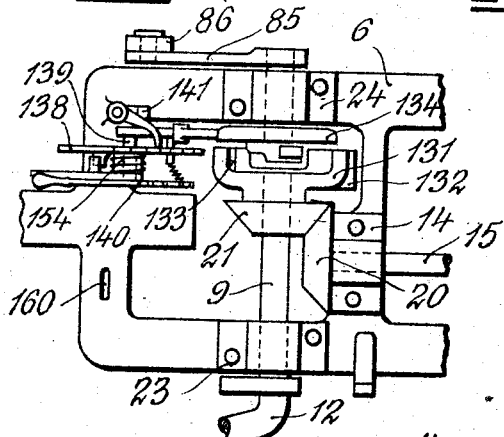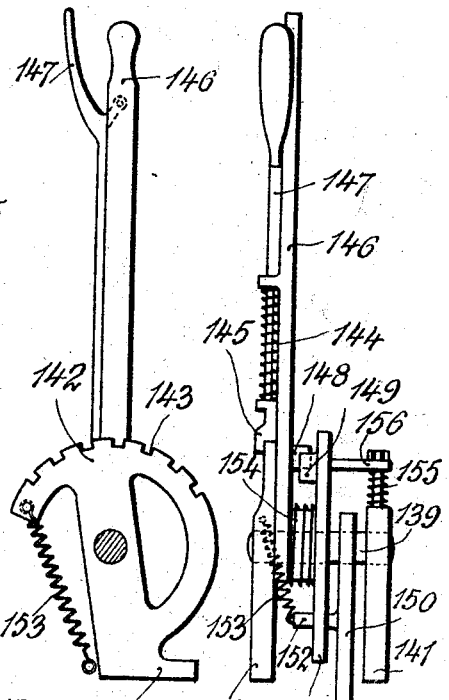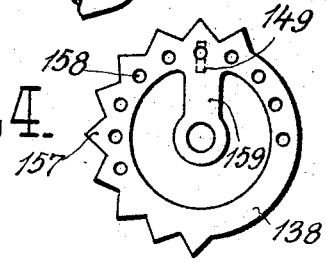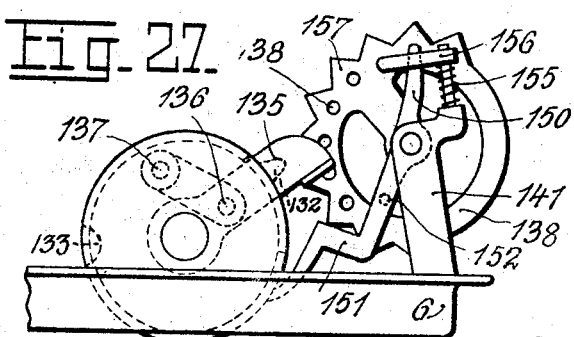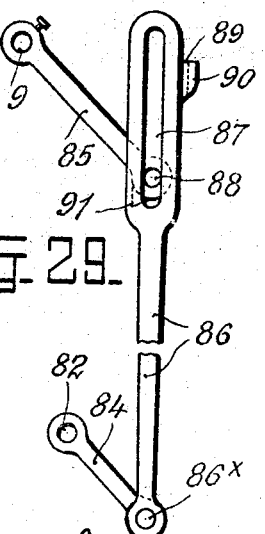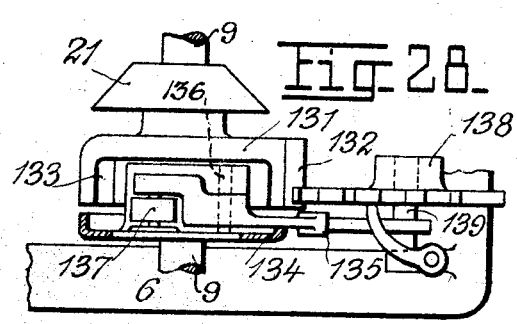

Patented May 24, 1927.

1,630,033

UNITED STATES PATENT OFFICE.

JOHANNES RUDLAND, OF NORDRE FRON, GUDBRANDSDALEN, NORWAY, ASSIGNOR TO INTERESSENTSKAPET JOHS. RUDLANDS SELVBINDER, OF LILLEHAMMER, NORWAY.

MOWING AND REAPING MACHINE.

Application filed February 15, 1924, Serial No. 693,089, and in Norway July 15, 1922.

My invention relates to an auxiliary apparatus adapted to be attached to a mowing or reaping machine of any suitable construction for the purpose of providing means for automatically gathering and sheaving the grain cut by the mowing machine, and discharging the finished sheaves.

For this purpose the apparatus comprises an auxiliary frame attached to the mowing machine, a detachably fixed plate, another detachable grain dividing plate movable by aid of a tilting mechanism, a grain gathering or conveyor mechanism, a needle mechanism, a sheaf binding mechanism and a controlling mechanism, all of which mechanisms are driven from the wheel axle of the mowing machine.

In the following description the novel features of my invention will be explained in detail with reference to the accompanying drawings, in which:

Fig. 1 is a plan view of a machine embodying my invention.

Fig. 2 is a front view of the same.

Fig. 3 is a sectional view on line III—III, Fig. 1, seen from the front side of the machine and with the frame in horizontal position.

Fig. 4 is a sectional view on line IV—IV, Fig. 1, seen towards the left.

Fig. 5 is a sectional view on line V—V, Fig. 1, seen towards the right.

Fig. 6 illustrates on a larger scale a part of the grain gathering mechanism, in plan view.

Fig. 7 is a front view, corresponding to Fig. 6.

Fig. 8 is a side view and Fig. 9 a plan view, respectively, of the means for transmitting motion from a crank shaft to the grain dividing mechanism.

Fig. 10 is a plan view, and Fig. 11 a front view, respectively, of the twine tightening mechanism.

Fig. 12 is a side view seen from the right of the binding mechanism.

Fig. 13 is a plan view of the binding mechanism.

Fig. 14 illustrates a detail of the binding mechanism, seen from the end.

Fig. 15 is a corresponding view, seen from the opposite side.

Fig. 16 is an end view, on a larger scale, of another detail of the binding apparatus.

Fig. 17 illustrates a constructional element of the mechanism shown in Fig. 16.

Fig. 18 illustrates, on a still larger scale, another constructional element of the mechanism shown in Fig. 16.

Figs. 19, 20 and 21 are, respectively, a front view, a side view and a plan view of a third constructional element of the mechanism shown in Fig. 16.

Fig. 22 illustrates a fourth constructional element of the mechanism shown in Fig. 16, comprising the twine cutting and gripping mechanism.

Fig. 23 is a plan view of the controller mechanism, and

Figs. 24, 25, 26, 27 and 28 illustrate details of the same, Fig. 24 illustrating a counting wheel, Fig. 25 a toothed sector, Fig. 26 the said sector with controlling handle, counting wheel and accessories. Figs. 27 and 28 illustrate details of the coupling and disengaging means in side view and plan view, respectively.

Fig. 29 illustrates part of the means for transmitting motion from the crank shaft to the needle of the binding or sheaving mechanism.

Referring now to Figs. 1 to 5, A is an auxiliary frame attached to the finger bar 57 of the mowing machine and suspended from the said machine by aid of a bar or arm 162 (Fig. 3). The manner in which this suspension is effected, will be explained in the following description. The auxiliary frame A comprises a substantially horizontal frame 1 of ⌐ iron or the like cross section, provided with flat iron stays 2 and 3. The frame 1 carries an upright frame 4 and a standard 5 (Fig. 2). The upright frame 4 carries a supporting frame 6 (Fig. 5).

On the stays or bars 2 and 3 is supported the grain conveying or gathering mechanism B, to be described further in the following description. The frame 1 also carries the plates 7 and 8 (Figs. 1 and 5) and the mechanism C for lifting the plate 8. The needle mechanism E of the binding apparatus F is mounted partly on the frame 1, and partly on the frame 6.

The gathering mechanism B, the lifting mechanism C, the tightening mechanism D, the needle mechanism E and the binding mechanism F are all driven from a crank shaft 9, journalled in the frame 6 and in the standard 5, respectively, the two latter parts being interconnected by a stay 10, provided with a bend 11, to make room for the crank 12. The binding apparatus F is mounted on the crank shaft 9 and through an arm is connected to the stay 10.

The controlling mechanism G which is mounted partly on the frame 6, and partly on the crank shaft 9, will be further explained in the following description.

The power transmitting mechanism consists of a shaft 15 mounted in bearings 13 and 14 and carrying a sprocket wheel 16, driven by aid of a sprocket chain 17 from a sprocket wheel 18 on the wheel axle 19 of the mowing machine. At the outer end of the shaft 15 is fastened a bevel gear 20 engaging a bevel gear 21 on the crank shaft 9. This crank shaft is journalled in bearings 22, 23 and 24, the bearing 22 being mounted on the standard 5 and the bearings 23 and 24 in the frame 6. The grain gathering mechanism B is operated from the shaft 9 by a rod 25 which is connected at one end to the crank 12 by a hinge joint 28 and at the other end by a hinge joint 29 to the vertical member 26 of a swinging frame 30 (Fig. 2). The horizontal members 31, 32 of said frame project through and are slidable in perforations 33, 34, in the upright frame 4. An extension 27 of the frame member is connected to the carriage 35 of the grain gathering mechanism by being bent at an angle so as to form a hook 36 (Fig. 4) engaging an aperture 37 in the carriage 35 (Fig. 6).

The active part of the grain gathering apparatus B (Figs. 6 and 7) above mentioned is the carriage 35, running along the bars 2, 3 and having depending lugs 38, 39 gripping both sides of the bar 3; on the underside of this bar bolts 40, 41 passed through the said lugs prevent the carriage from being lifted up from the bar 3, the carriage running by aid of a roller 42 mounted on it (Fig. 6) along the bar 2. The carriage 35 is provided with lugs 44, 45, in which is mounted a rod 43, the ends of which are bent into arms or prongs 46 and 47, respectively. The rod 43 is also provided with a depending lug or nose 48. The arms or prongs 46, 47 are curved so as to gather and pack the grain when the carriage is moved from its extreme left to its extreme right position. On the return of the carriage towards its extreme left position (that shown in Fig. 1) the lug or nose 48 strikes against a lug 49 on frame 1 (Figs. 1, 6 and 7), thereby lifting up the arms or prongs 46, 47, (which during the return movement of the carriage 35 are lowered below the level of the plates 7 and 8) upwards into the position shown in Fig. 7, ready for the gathering of the grain. After a stop of predetermined length the carriage 35 is again driven forwards towards the right by the crank 12 and the members 25, 26, 27, the raised prongs 46, 47 carrying with them the grain that has meantime been cut by the mowing machine and is lying on the plates 7 and 8, and delivering it to the binding mechanism F. After having transferred the grain to the binding apparatus the carriage is reversed, the prongs 46, 47 being tilted by the shock due to the reversal of the movement, and falling below the level of the plates 7, 8. A projection 50 (Fig. 6) on the lug 48 by striking against the carriage 35 prevents the prongs 46, 47 from being lowered more than desired.

The plate 7 is fastened to the frame 1 by aid of bolts 51, and is provided with ribs 52 (Figs. 1 and 5). At 53 it is cut out to give room for the needle.

The plate 8 is hinged to the frame 1 by aid of bolts 54, 55 and provided with a rib 56. The plates 7 and 8 are arranged in such manner that the prong 46 may move between them and the prong 47 may be moved just in front of the plate 8 and above the back edge of the finger bar 57 of the mowing machine.

I will now describe the lifting or grain dividing mechanism C. The plate 8 is swung upwards about its hinge bolts 54, 55 by aid of a bell crank lever 59, provided with an antifriction roller 58 (Fig. 5). This lever 59 swings about a hinge bolt 60, fastened to the frame bar 2, and its lower arm is through a link rod 61 interconnected with an arm of a bell crank lever 62, pivoted on a bolt 63 on a lug 64, fastened to the frame 1. The other arm $62^x$ of the lever 62 is through a link rod 66 adjustably hinged to a lever 65. This lever 65 (Figs. 8 and 9) swings about a hinge bolt 67 on a standard 68, fixed to the frame 6. The lever 65 is forked and in its fork carries a cam roller 69 in contact with a cam 70 on the crank shaft 9. Said cam through the intermediary of the linkage just described raises and lowers the plate 8 at predetermined intervals, thereby separating the grain acted on by the prongs 46, 47 from the grain more recently cut by the mowing machine knives. The lever arm $62^x$ has an elongation $62^y$ engaging at predetermined intervals the twine tightening mechanism D in such manner that the tightening device for the binding twine is opened simultaneously with the lifting of the plate 8, thereby relaxing the tension of the twine while the needle makes its return movement, which operation shall be further explained in the following description.

The tightening mechanism D (Figs. 10 and 11) consists of two discs or sheaves 71, 72, mounted in casings 73, 74. The casing 73 is fixed to the frame 1, while the casing 74 is hinged to the casing 73 by aid of hinge bolts 75. The discs 71, 72, between which the binding twine passes on to the needle mechanism, are kept pressed against one another by means of a spring device 76. To the casing 74 is fastened a rod 77 with a hooked end, engaging the lever elongation 62^y as above mentioned, the latter raising the rod 77, and thereby swinging the casing 74, whereby the disc 72 is lifted from its contact with the disc 71 and the tension of the twine is relaxed. When the lifting of the rod 77 through the arm 62^y ceases, the disc 72 is again returned into its contacting position by means of the spring device 76. The twine ball is hung on the frame 4 in any suitable manner (not shown in the drawings), and may be protected by a housing or the like.

In the following description the needle mechanism E is to be described. The binding twine (not shown in the drawings) from the tightening discs or rollers 71, 72 passes to the eye 78 (Figs. 1 and 5) in a standard 79 fixed to the frame 1 and serving as a journal for the needle 80. From the eye 78 the twine passes through the eye 81 of the needle 80 to the binding mechanism. The needle 80 is fastened to or integral with a shaft 82, journalled in the standard 79 and in the frame 1 at 83. At its other end this shaft 82 (Fig. 29) carries an arm 84, which is jointed through a hinge bolt 86^x to a slotted link 86 engaging with its slot 87 a bolt 88 on the arm 85. The slotted link 86 is also provided with a projection 89 having a lug 90, contacting at each rotation of the crank shaft 9 with a lug 91 on the head of the arm 85 and thereby carrying the needle 80 forcibly back from the binding apparatus, the lugs 90, 91 being disengaged at the further rotation of the crank shaft 9. By aid of this link system the needle is moved from its lowest position below the level of the plates 7 and 8 to its highest position in order to cooperate in the binding process as shall be explained later on.

The binding mechanism F (Figs. 12 to 21) comprises a casing 92 loosely mounted on the shaft 9. This casing through an arm 93 is fastened to the supporting rod 10 and through an arm 172 to the standard 5. To the arm 173 may be fastened a protection plate for covering the binding mechanism. The binding apparatus further comprises a bevel gear 94 fast on the crank shaft 9 and engaging a bevel gear 95 journalled in a bracket 96 on the casing 92 with a short shaft 97 carrying at its lower end an ejector arm 98, said arm in its swinging first tightening the knot recently made and then ejecting the ready bound sheaf. The binding apparatus further comprises a partly toothed disc 99 fast to the shaft 9 and engaging a partly toothed bevel gear 100 on a shaft 101. This shaft 101 is journalled obliquely in the casing 92 and on its lower end carries the twine knotter 102 having pivoted to it a tongue 103, swinging on a pivot 104 and kept open relatively to the twine knotter 102 at predetermined times when the antifriction roller 106, mounted on the elongation 107 of the tongue 103 is during a certain part of a revolution, pressed against the cam-shaped part 105. On the outside of the knotter 102 is mounted a spring plate 108 connected to the casing 92 by a pin 109 and a spring 110 and provided with supporting lugs 111. By aid of this spring plate the tongue 103 is pressed against the twine knotter as soon as the roller 106 descends from the highest part of the cam 105, thereby keeping the twine in place during the knotting operation performed during one revolution of the twine knotter. Intermittent movement is imparted to the knotter 102 by the disc 99 which has a toothed edge 99^x and a smooth edge portion 99^y, said toothed portion engaging the teeth of the bevel pinion 100 and the smooth portion cooperating with a cut out portion 100^x in said bevel gear. (Figs. 14 and 16.)

The binding apparatus further comprises a gripping and cutting apparatus, consisting of a cutter knife 112 (Fig. 22), a roller 113, a guide 114, two cam bails 115, 116, fastened to the outer side of the disc 99 (Figs. 13, 15 and 16), a transmission plate 117, pivoted links 118, 119 and a spring arrangement 120. On the bottom 121 of the casing 92, which has been widened so as to project in front and in rear of the casing in order to prevent straw and dirt from getting into the binding apparatus, is mounted a fixed rib 122 for the guide 114 mentioned above, said guide swinging back and to and fro about a pivot 126 by the action of the transmission plate 117, which by means of a pivot 123 swings on a standard 124, fast to the bottom 121. The roller 113 through a link 118 and a pivot 127 is connected to the transmission plate 117 but has a shorter motion than the guide 114, the latter being suspended from the plate 117 at a greater distance from the pivot 123 than the link 118. The roller 113 is kept pressed downwards by the spring 120, abutting against a lug 125 on the casing 92, and thereby grips the twine between itself and the rib 122. The cutter 112 is adapted to be swung about the pivot 128 of the roller 113 and through a link 119 and a pivot 129 is pivotally connected to the pivot 126 of the plate 117. The transmission plate 117 is moved by the bails 115, 116 (Figs. 12 to 16) in such manner, that when the top end of the plate 117 is in engagement with the bail 115, it is moved in a direction towards the standard 5, whereby the twine is gripped, and when the plate 117 is in engagement with the bail 116, as indicated in dotted lines in Fig. 16, it is moved in a direction away from the standard 5, whereby the knife, moving more rapidly than the roller, is swung down and cuts off the twine. The bail 130 serves as a guide for the binding twine.

In order to adapt the invention for use both for thick and for thin straw, I have invented a controlling mechanism G (Figs. 1 and 23–28) partly mounted on the frame 6 and partly on the crank shaft. As before mentioned the bevel gear 20 on the end of the driving shaft 15 engages the bevel gear 21 on the crank shaft 9. This latter gear is formed as a part 131 of a coupling clutch and is loose on the crank shaft. The clutch part 131 is provided with one or more teeth 132 on its outer periphery and with a semi-cylindrical lug 133 on its inside. The crank shaft further carries a disc 134 keyed on to it, there being provided a movable hammer 135, which swings on a pivot 136 on the disc 134 and provided with an antifriction roller 137. After the loose bevel gear 121 has made a predetermined number of revolutions the hammer 135 falls, due to an escapement device to be described hereinafter, whereby the antifriction roller 137 is swung out and is gripped by the inner lug 133 of the member 131. Hereby the disc 134 is turned and the hammer 135, the crank shaft and all the mechanisms connected to it, make one complete series of movements, whereupon the hammer—and therewith all the mechanisms connected to the crank shaft—are again stopped, until after the predetermined number of revolutions of the driving shaft 15 the same series of operations is repeated.

The controlling apparatus also comprises a counting wheel 138, mounted on a shaft 139, journalled in standards 140, 141, mounted on the frame 6. The standard 140 (Fig. 25) is formed as a sector 142 with notches 143 for locking the spring pressed tooth 145 (actuated by the spring 144) of a rod 147, fastened to the controller handle 146. This handle is provided with a lug 148 corresponding to a lug 149 on the wheel 138. On the shaft 139 is also mounted a lever 150, having its one arm 151 bent at an angle and formed as an anvil for the hammer 135. This arm is also provided with a pin 152 passing through the counting wheel and through a spring 153 connected to the sector 142. The controller handle 146 and the counting wheel are interconnected through a spring 154 coiled about the hub of the wheel. The standard 141 has an elongation 155 carrying a spring pressed arm 156, contacting with the surface of the counting wheel 138, which is provided with a number of teeth 157, and a corresponding number of borings 158, for engagement with the arm 156. The teeth 157 correspond to the tooth 132 in the clutch member 131.

The controller handle is put in position with its lug 145 engaging one of the notches 143. Hereby the lug 148 will be kept in a definite position, and the lug 149 on the wheel 138 loosely mounted on the shaft 139 will be pressed against the lug 148 by the action of the spring 154. According to the position of the lug 148 a larger or smaller number of the teeth 157 will enter into engagement with the tooth 132, which at each revolution of the clutch member 131 imparts to the counting wheel a movement corresponding to the width of a tooth. After the last tooth 157 has been in engagement with the tooth 132, the arm 159 of the counting wheel engages the pin 152 on the lever 150 and carries the latter forward against the spring-actuated arm 156, which gives way until the lever is free of the hammer 135, making this latter fall, thereby coupling the crank shaft to the driving shaft by means of the roller 137 in the manner explained above. The counting wheel 138 and the lever 150, respectively, are carried back to their original positions by the spring 153, 154, the movement of the counting wheel being hereby controlled by the lug 148, and the lever 150 carrying with it the hammer 135.

The frame A is through an eye bolt 160 (Figs. 1 and 5) and elastic connection means (as hooks 161) suspended in a bar 162 fastened to the frame of the mowing machine. The bar 162 is supported by a post 163, which is fastened to the draw bar of the mowing machine in suitable manner.

The standard 5 (Figs. 2 and 5) is provided with an adjustable angle-shaped elongation 164, connected to the bar 10 through a stay 165. In the upper horizontal part of the elongation 164 are provided borings 166, 166 for a reel shaft 168, which may at one end be provided with a sheave 168$^x$, driven for instance from the wheel axle 19 of the mowing machine. The purpose of this reel is as usual to make the straw bend towards the cutter knives of the mowing machine.

On the outer side of the finger bar 57 and connected to the frame 1 is mounted a straw separator, comprising as usual a slide 169 with plate 170 and dividing bar 171. On the inner side of the finger bar is arranged the straw guide 174.

The apparatus works in the following manner:

When the twine has been placed in order and the carriage of the grain gathering mechanism placed in its outer (extreme left)

position, the plate 7, 8 is lying down, the twine knotter 102 is turned straight backwards and the twine cutting and gripping device is in its intermediate position.

When the mowing machine starts its forward movement the revolutions of the driving shaft 15 are transmitted to the counting wheel, which after a predetermined number of revolutions releases the hammer 135 and couples the crank shaft to the driving shaft, so as to cause the former to make a single revolution, whereupon it is again uncoupled. The crank moves the carriage of the gathering device with its prongs raised thereby carrying with it the cut grain lying across the plates 7 and 8 until the prongs are about in line with the eye of the needle. At this junction the needle is raised, passes the prongs and throws a loop of the twine into the sheaf binding device. When the needle has about reached its vertical position the dividing plate 8 is raised, thereby preventing fresh cut grain from coming into the path of the needle on its returning to its original position. The shock due to the reversal of direction of the carriage makes the arms or prongs 46, 47 fall, but when the carriage approaches its extreme outer position they are raised again by means of the lugs 48 and 49. The binding mechanism makes a knot on the twine loop, grips the twine for the following knot and cuts off the twine behind the recently completed knot. The sheaf is now gripped by the ejector arm which draws tight the knot and throws the completed sheaf down between the outer wheel of the mowing machine and the auxiliary frame. When the carriage of the gathering mechanism has been returned to its extreme outer position the plate 8 falls down and the whole mechanism remains inactive until the crank shaft is anew coupled in by the counting wheel.

While in the foregoing there is only described one specific form of the invention it will be understood that many alterations in the details may be made without departing from the scope of the invention.

Claims:

1. The combination with a mowing machine, including a finger bar, of an auxiliary frame suspended from the mowing machine, a grain gathering mechanism movable on the auxiliary frame behind the finger bar, means for periodically arresting the movement of the cut straw into the path of the grain gathering mechanism, binding, knotting and ejecting mechanisms carried by the auxiliary frame, and means operable by the movement of the mowing machine for actuating the above named mechanisms.

2. The combination with a mowing machine including a finger bar, of an auxiliary frame suspended from the mowing machine, grain gathering members adapted to be reciprocated longitudinally of the finger bar, means for arresting the movement of the cut grain during the movement of said members in one direction, binding, knotting and ejecting mechanisms carried by the auxiliary frame, and means operable by the movement of the machine for actuating said mechanisms.

3. The combination with a mowing machine, including a finger bar, of an auxiliary frame suspended from the machine, a reciprocating carriage movable on the frame longitudinally of and behind said bar, prongs pivoted on said carriage adapted to be automatically raised and lowered by the movement of the carriage in opposite directions, means for arresting the movement of the cut grain during the movement of the carriage in one direction, and means operated by the movement of the machine for actuating the carriage.

4. The combination with a mowing machine including a finger bar, of an auxiliary frame suspended from the machine, a reciprocating carriage movable on the frame longitudinally of and behind said bar, prongs pivoted on said carriage adapted to be automatically raised and lowered by the movement of the carriage in opposite directions, means to arrest the movement of the cut straw during the movement of the carriage in one direction, and means for actuating the carriage and straw arresting means.

5. The combination with a mowing machine including a finger bar, of an auxiliary frame comprising a stationary plate, a pivoted plate between the latter and the finger bar, grain gathering members movable behind said bar, means to reciprocate said members longitudinally of the bar, and means to raise the pivoted plate during the movement of said gathering members in one direction.

6. The combination with a mowing machine, including a finger bar, of an auxiliary frame connected with the machine frame behind the bar, grain gathering means reciprocably mounted on the frame, grain dividing means cooperating with the gathering means, binding, knotting and ejecting means carried by the frame, and actuating mechanism for said means comprising a driving shaft, a bevel gear thereon, a crank-shaft, a bevel gear loosely mounted on the latter in mesh with the aforesaid gear, a sprocket wheel on the axle of the mowing machine operatively connected with the driving shaft, and a clutch for connecting the loose gear to the crank shaft.

7. The combination with a mowing machine, including a finger bar, of an auxiliary frame, a stationary straw-receiving plate mounted in the latter, a plate pivoted in front of the stationary plate, a straw-gathering member movable between the stationary plate and the finger-bar, and mechanism operable by the movement of the mowing machine for periodically actuating the straw-gathering member and said pivoted plate.

8. The combination with a mowing machine, including a finger-bar, of a grain-gathering device, mechanism for reciprocating the latter longitudinally of the finger bar, means to arrest the movement of the cut grain during the movement of the gathering device in one direction, a binding mechanism co-operating with the gathering device comprising a twine carrying needle, a guide for the twine, means for gripping the twine, a twine knotting mechanism, a twine cutter, and means operated by the movement of the mowing machine for actuating the binding mechanism.

9. In a machine of the character described, a reciprocating grain gathering mechanism, means to arrest the movement of the cut grain during the movement of said mechanism in one direction, a grain binding mechanism co-operating with the latter and comprising a twine carrying needle, a rock shaft carrying the needle, a crank shaft actuated by the movement of the machine, and link mechanism connecting the crank-shaft and rock-shaft for actuating the latter.

10. In a machine of the character described, a grain gathering mechanism, a grain binding mechanism co-operating with the latter and comprising a twine carrying needle, a rock shaft carrying the needle, a crank shaft actuated by the movement of the machine, link mechanism connecting the crank shaft and rock-shaft for actuating the latter, a guide plate for the twine, a movable disc for pressing the twine against the guide plate, and a knife co-operating with the latter for cutting the twine.

11. In a machine of the character described, a grain gathering mechanism, means for reciprocating the latter longitudinally of the finger bar of said machine, a sheaf binding mechanism comprising a twine carrying needle, means for raising and lowering the latter with the movements of the gathering mechanism, knot forming members co-operating with the needle, means for rotating the knot forming members, a spring actuated disc for automatically loosening and tightening the twine, and mechanism operable by the movement of the machine for timing the movement of the parts.

12. In a machine of the character described, a grain gathering mechanism, means for reciprocating the latter longitudinally of the finger bar of said machine, means to arrest the movement of the cut grain during the movement of said mechanism in one direction, a sheaf binding mechanism comprising a twine carrying needle, means for raising and lowering the latter with the movements of the gathering mechanism, knot forming members co-operating with the needle, means for rotating the knot forming members, a spring actuated disc for automatically loosening and tightening the twine, a guide for the twine, a movable disc for pressing the twine against the guide, a knife co-operating with the latter for cutting the twine, a revolving arm for tightening the knotted twine and for ejecting the bound sheaf, and mechanism operable by the movement of the machine for timing the operation of the parts.

13. A machine of the character described, comprising a grain cutting mechanism, a reciprocating grain gathering mechanism, means for arresting the movement of the cut grain during the movement of the grain gathering mechanism in one direction, a binding mechanism co-operating with the gathering mechanism, a shaft operable by the movement of the machine for actuating the gathering and binding mechanisms, and mechanism for controlling the operation of the shaft whereby the latter rotates at pre-determined intervals.

14. A machine of the character described, comprising a grain cutting mechanism, a grain gathering device arranged behind the latter, means for reciprocating the gathering device longitudinally of the cutter mechanism comprising a crank-shaft, a driving shaft operable by the movement of the mowing machine, means for arresting the movement of the cut grain during the movement of the gathering device in one direction and mechanism for operatively connecting the driving shaft to the crank-shaft to rotate the latter at predetermined intervals.

15. A machine of the character described, comprising a grain cutting mechanism, a grain gathering device arranged behind the latter, means for reciprocating the gathering device longitudinally of the cutter mechanism comprising a crank-shaft, a driving shaft operable by the movement of the mowing machine, means for arresting the movement of the cut grain during the movement of the gathering device in one direction, and mechanism for operatively connecting the driving shaft to the crank-shaft to rotate the latter at predetermined intervals.

16. A machine of the character described, comprising a grain cutting mechanism, a grain gathering device arranged behind the latter, means for reciprocating the gathering device longitudinally of the cutter mechanism comprising a crank-shaft, a driving shaft operable by the movement of the mowing machine, mechanism for operatively connecting the driving shaft to the crank-shaft to rotate the latter at predetermined intervals, means to arrest the movement of the cut grain during the movement of said gathering device in one direction, a twine carrying needle, and link mechanism operable by the crank shaft for actuating the needle.

17. A machine of the character described, comprising a grain cutting mechanism, a grain gathering device arranged behind the latter, means for reciprocating the gathering device longitudinally of the cutter mechanism comprising a crank shaft, a driving shaft operable by the movement of the mowing machine, a pinion on the driving-shaft, a pinion loose on the crank-shaft meshing with the pinion on the driving-shaft, clutch members on the crank-shaft, and mechanism for periodically operating the clutch members to connect the loose pinion with the crank shaft.

18. A machine of the character described, comprising a grain cutting mechanism, a grain gathering device arranged behind the latter, means for reciprocating the gathering device longitudinally of the cutter mechanism comprising a crank-shaft, a driving shaft operable by the movement of the mowing machine, a pinion on the driving shaft, a pinion loose on the crank-shaft meshing with the pinion on the driving-shaft, clutch members on the crank-shaft, a control wheel, mechanism for connecting the latter with one of the clutch members, and means for regulating the control-wheel whereby the number of revolutions of the crank shaft is regulated relatively to the number of revolutions of the driving shaft.

19. A machine of the character described, comprising a grain cutting mechanism, a grain gathering mechanism arranged behind the latter, a driving shaft operable by the movement of the mowing machine, a crank shaft, operating mechanism connecting the latter with the grain gathering mechanism, a pinion on the driving shaft, a pinion loose on the crank-shaft meshing with the aforesaid pinion, a clutch member on the loose pinion, a disc fixed on the crank-shaft, and an escapement mechanism for connecting the clutch member with the disc, whereby the movement of the drive shaft is imparted to the crank-shaft.

20. In a machine of the character described, a grain cutting mechanism, a grain gathering mechanism, a drive shaft operable by the movement of the machine, a crank shaft, operating mechanism connecting the latter with the grain gathering mechanism, mechanism for periodically connecting the drive shaft with the crank shaft, a binding mechanism comprising a knotter arm, means operated by the drive shaft for periodically rotating the arm, a tongue pivoted on and adapted to be rocked by the movement of the arm, and a spring controlled plate engaging said arm to control the twine during the knotting operation.

21. In a machine of the character described, a grain cutting mechanism, a grain gathering mechanism, a drive shaft operable by the movement of the machine, a crank shaft, operating mechanism connecting the latter with the grain gathering mechanism, for periodically connecting the drive shaft with the crank shaft, a binding mechanism comprising a knotter arm, means operated by the drive shaft for periodically rotating the arm, a tongue pivoted on and adapted to be rocked by the movement of the arm, a spring controlled plate engaging said arm to control the twine during the knotting operation, a guide plate, a movable disc for pressing the twine against the guide plate, a knife cooperating with the latter for cutting the twine, an ejector arm, and means operable by the drive shaft for swinging said arm.

In testimony that I claim the foregoing as my invention, I have signed my name.

JOHANNES RUDLAND.